(12) United States Patent
Lilja

(10) Patent No.: US 12,245,624 B2
(45) Date of Patent: Mar. 11, 2025

(54) PULSED ELECTRIC FIELD CHAMBER

(71) Applicant: OPTICEPT TECHNOLOGIES AB, Lund (SE)

(72) Inventor: Per Lilja, Limhamn (SE)

(73) Assignee: OPTICEPT TECHNOLOGIES AB, Lund (SE)

( * ) Notice: Subject to any disclaimer, the term of this patent is extended or adjusted under 35 U.S.C. 154(b) by 440 days.

(21) Appl. No.: 17/642,109

(22) PCT Filed: Sep. 11, 2020

(86) PCT No.: PCT/SE2020/050853
§ 371 (c)(1),
(2) Date: Mar. 10, 2022

(87) PCT Pub. No.: WO2021/049997
PCT Pub. Date: Mar. 18, 2021

(65) Prior Publication Data
US 2022/0361533 A1    Nov. 17, 2022

(30) Foreign Application Priority Data
Sep. 11, 2019   (SE) .................................. 1951028-8

(51) Int. Cl.
*A23L 5/30*       (2016.01)
(52) U.S. Cl.
CPC .. *A23L 5/30* (2016.08); *A23L 5/36* (2016.08)
(58) Field of Classification Search
CPC ..... A23L 2/50; A23L 3/26; A23L 3/32; A23L 3/325; A23L 5/30; A23L 5/36
See application file for complete search history.

(56) References Cited

U.S. PATENT DOCUMENTS

| 5,549,041 | A | | 8/1996 | Zhang et al. |
| 5,662,031 | A | * | 9/1997 | Qin .......................... A23L 3/005 |
| | | | | 99/451 |

(Continued)

FOREIGN PATENT DOCUMENTS

| CN | 101502304 A | 8/2009 |
| CN | 101502304 B | 9/2011 |

(Continued)

OTHER PUBLICATIONS

Kang Huang; Jianping Wang: "Design of pulsed electric fields treatment chambers for liquid foods pasteurization process: A Review", Journal of Food Engineering; vol. 95, Issue 2, Nov. 2009, pp. 227-239.

(Continued)

*Primary Examiner* — Reginald Alexander
(74) *Attorney, Agent, or Firm* — MOSER TABOADA

(57) ABSTRACT

The present invention describes a PEF (pulsed electric field) chamber 1 intended for treating a flow with electric field pulses, said PEF chamber comprising a PEF treatment tube 2 and opposite electrode units 3, 4, wherein said opposite electrode units 3, 4 each has one flow receiving end 5a, 5b and one flow exit end 6a, 6b, wherein the PEF treatment tube 2 comprises exit flow portions 7a, 7b arranged subsequent to the flow exit ends 6a, 6b of the electrode units 3, 4 in the intended flow direction, and thus functioning as an extension of the opposite electrode units 3, 4 in the intended flow direction, wherein the exit flow portions 7a, 7b of the PEF treatment tube 2 are arranged to provide a geometrical narrowing 20 subsequent to the flow exit ends 6a, 6b.

10 Claims, 4 Drawing Sheets

(56) References Cited

U.S. PATENT DOCUMENTS

Figure 1:
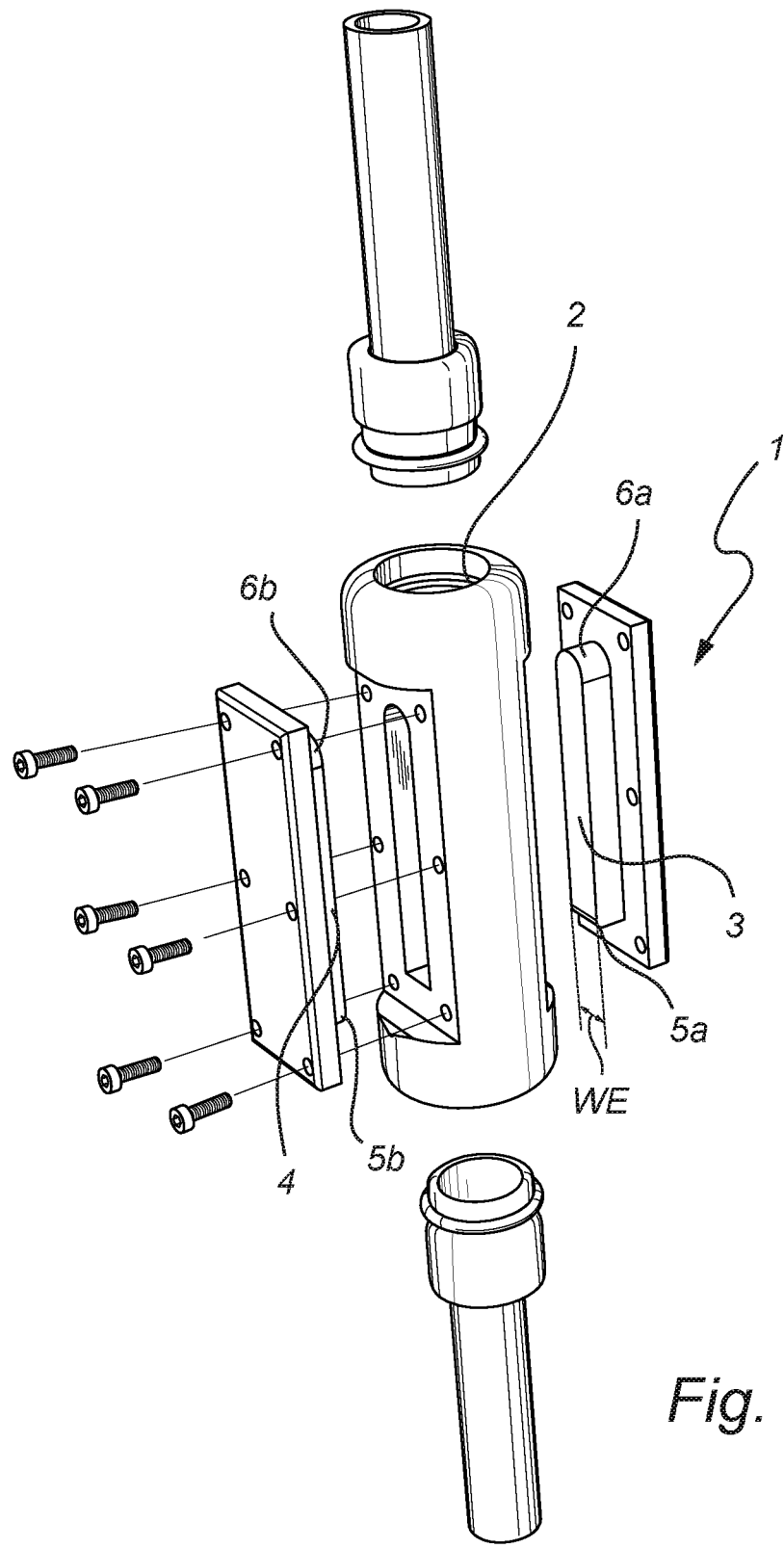

| | | | | |
|---|---|---|---|---|
| 5,690,978 | A * | 11/1997 | Yin | A23L 3/32 |
| | | | | 99/451 |
| 6,178,880 | B1 * | 1/2001 | Mastwijk | C02F 1/48 |
| | | | | 99/451 |
| 2001/0017082 | A1 | 8/2001 | Morshuis et al. | |
| 2004/0029240 | A1 | 2/2004 | Acker | |
| 2005/0113601 | A1 * | 5/2005 | Herold | C07C 263/10 |
| | | | | 560/347 |
| 2008/0279995 | A1 | 11/2008 | Schultheiss et al. | |
| 2008/0296268 | A1 | 12/2008 | Mike et al. | |
| 2012/0297990 | A1 * | 11/2012 | Sonder | A23L 3/005 |
| | | | | 99/451 |
| 2015/0216220 | A1 | 8/2015 | Sonder | |
| 2016/0302457 | A1 * | 10/2016 | Jun | A01N 1/0252 |

FOREIGN PATENT DOCUMENTS

| | | |
|---|---|---|
| CN | 109429494 A1 | 3/2019 |
| CN | 109663556 A | 4/2019 |
| EP | 1 123 662 A1 | 8/2001 |
| GB | 2487796 A | 8/2012 |
| JP | 2011072905 A | 4/2011 |
| JP | 2012236130 A | 12/2012 |
| WO | WO 9015547 A1 | 12/1990 |
| WO | WO 2006/121397 A1 | 11/2006 |
| WO | WO 2009141036 A1 | 11/2009 |
| WO | WO 2016/171610 A1 | 10/2016 |
| WO | WO 2017/184066 A1 | 10/2017 |
| WO | WO 2019158491 A1 | 8/2019 |

OTHER PUBLICATIONS

Sack M: Mueller G.: "Scaled design of PEF treatment reactors for electroporation-assisted extraction processes", Innovative Food Science & Emerging Technologies, vol. 37, Part C, Oct. 2016, pp. 400-406.

Swedish Search Report for application No. 1951028-8, dated Sep. 11, 2019.

International Search Report for application No. PCT/SE2020/050853, dated Jan. 10, 2020.

* cited by examiner

PULSED ELECTRIC FIELD CHAMBER

FIELD OF THE INVENTION

The present invention relates to a PEF (pulsed electric field) chamber with optimal electrode geometry for continuous flows.

TECHNICAL BACKGROUND

There are existing PEF chambers. One such is disclosed in WO 2017/184066 where there is described a PEF chamber comprising a PEF treatment tube, a casing and at least two electrode units, wherein said at least two electrode units are insertable to be fixated in the casing and into the PEF treatment tube.

Furthermore, in WO 2016/171610 there is also disclosed a PEF chamber with a geometrical narrowing.

The present invention refers to a PEF chamber which has a geometry and especially an electrode arrangement which are beneficial for several types of applications, such as e.g. for treating different form of food stuffs and other pumpable materials, e.g. slurries or the like. As mentioned above, the PEF chamber has an optimal electrode geometry for treatment of continuous flows.

SUMMARY OF THE INVENTION

The purpose stated above is solved by a PEF (pulsed electric field) chamber intended for treating a flow with electric field pulses, said PEF chamber comprising a PEF treatment tube and opposite electrode units, wherein said opposite electrode units each has one flow receiving end and one flow exit end, wherein the PEF treatment tube comprises exit flow portions arranged subsequent to the flow exit ends of the electrode units in the intended flow direction, and thus functioning as an extension of the opposite electrode units in the intended flow direction, wherein the exit flow portions of the PEF treatment tube are arranged to provide a geometrical narrowing subsequent to the flow exit ends.

In relation to the above it may be said that the word "tube" should not be interpreted as limited to any specific geometry. Therefore, "tube" may in this be regarded as any geometry defining a certain volume of which at least a part is intended for PEF treatment. As seen in the figures, the PEF chamber according to the present invention is the entire system, which in turn comprises a PEF treatment tube being the part in which there is a PEF treatment volume where PEF treatment is intended. It is in this regard it should be understood that the PEF treatment volume may have many different types of geometry according to the present invention. As such, a tube is not limited to a tube geometry according to the present invention.

To mention something about today known devices and systems, it may be said that in U.S. Pat. No. 5,662,031 there is disclosed treatment systems for treating flowable food products using electrical pulses to inactivate microbes.

The systems described include one or more stages having flow-through processors and the flow-through processors have first and second electrodes being spaced across a treatment chamber in which an intense electrical field is generated using bipolar electrical pulses.

Moreover, in US 2008/0279995 there is disclosed a process for extracting useful substances from wine grapes, said process being achieved by electroporation of the must produced from red and/or white grapes. The device for carrying out must electroporation comprises a dielectric pipe, the flow duct for the must, in whose wall are arranged two mutually spaced electrodes to form a pulsed electric field between the electrodes.

U.S. Pat. No. 5,662,031 and US 2008/0279995 do not disclose a PEF chamber such as according to the present invention. One first important difference is related to the exit flow portions provided according to the present invention, which as such provides a geometrical narrowing of the tube or treatment volume. Further differences may be clear when reading the below and considering different features and embodiments of the present invention.

According to one embodiment of the present invention, the flow receiving ends are rounded in an intended flow direction into the PEF treatment tube. As notable from the embodiments shown in the drawings, the rounded flow receiving ends of the electrodes may also be described as bent ends. Furthermore, although a PEF chamber according to the present invention may be implemented in many different ways, one suitable alternative is as a vertical PEF chamber. Embodiments of such are shown in the drawings. In such a case, the flow receiving ends are positioned as lower electrode ends. The flow to be treated is suitably pumped up through the PEF chamber. This may be beneficial as a controlled needed pump pressure diminishes the risk for air entering into the PEF chamber. It should be noted that the PEF chamber according to the present invention may be placed in any geometrical direction and position, and is not limited to a configuration where the flow is pumped up through the chamber.

The PEF chamber according to the present invention provides several advantages when being compared to existing PEF chambers. The present PEF chamber provides a strong homogenous electric field (e-field) with minimized volumes with low e-field and without so called hot spots with high e-fields, which is beneficial since the volumes with low e-field reduces efficiency and the hot spots cause volumes where the temperature increases too much. Moreover, the PEF chamber according to the present invention provides an effective flow profile where there is a low risk of a part of the flow standing still. Such flow portions standing still are also a disadvantage for the treatment efficiency and for the risk of high temperature volumes.

The PEF chamber according to the present invention preferably comprises two flat parallel electrode units which expose two rectangular surfaces. It should in this regard be said that also other types of configurations and geometries are totally possible according to the present invention. The advantage with two flat parallel electrodes is, however that the electric field becomes very homogenous, but at the edges the electric field get two disadvantages. One first such problem is that the electric field becomes extremely high at the inflow side of the electrode units. As the PEF electrode units according to the present invention are rounded a too high electric field is prevented.

Other problems solved by and advantages provided by the PEF chamber according to the present invention are presented below in relation to the section of specific embodiments of the invention.

Specific Embodiments of the Invention

Below, some specific embodiment of the present invention are provided and described further.

According to one specific embodiment of the present invention, the PEF treatment tube comprises exit flow portions arranged subsequent to the flow exit ends of the electrode units in the intended flow direction, and thus functioning as an extension of the opposite electrode units in the intended flow direction, and wherein the exit flow portions are rounded in an intended flow direction. This embodiment implies that the material that the last portions of the electrode units meet is a rounded material on both sides, i.e. bent portions. Also this implies that hot spots of the electric field are prevented. Moreover, this type of geometry also provides a starting point for making sure that the passing flow of material to be treated is not standing still in the crossing between the electrode units and material subsequent to the electrode units. As the edges of the isolating material subsequent to the electrodes are rounded this also enables the provision of a homogenous electric field. Also the geometrical narrowing is important for the provision of both a homogenous electric field and a channel without positions where the flow is standing still. Further embodiments and possible improvements, such as geometrical narrowing(s), of the geometry are further explained below.

It may again be said that when considering the expression "PEF treatment tube" it should be noted that the PEF treatment tube is not limited to a certain geometry. The PEF treatment tube should be seen as the device structure as such, i.e. part of the entire PEF chamber, and not only the treatment volume. This may be clear when reviewing the figures.

According to yet another specific embodiment of the present invention, each electrode unit is insertable into matching grooves of the PEF treatment tube of the PEF chamber. Moreover, suitably the electrode units are both insertable and detachable, for example arranged with screws to enable this feature. One such alternative is shown in the figures. As the electrodes are worn out and has to be replaced by new ones after a certain usage time, this feature may be of interest to provide.

As is further explained below, according to one specific embodiment of the present invention, the opposite electrode units are longitudinal. Embodiments thereof are shown in the figures.

According to one specific embodiment of the present invention, the electrode units are arranged in the PEF treatment tube to provide a first geometrical narrowing at the flow receiving ends. One such alternative is shown in the figures. As hinted above, also this geometrical narrowing is of relevance for the provision of a homogenous electric field without hot spots and a through flow geometry where the risk of positions where the flow stands still is diminished.

As may be seen in the alternative shown in the figures, the first narrowing suitably is a lower geometrical narrowing as the flow is pumped into the chamber from a bottom and upwards.

A geometrical narrowing according to the present invention implies that the cross section area of the PEF tube is lowered in the geometrical narrowing when compared with a point before the geometrical narrowing.

Figure 4:
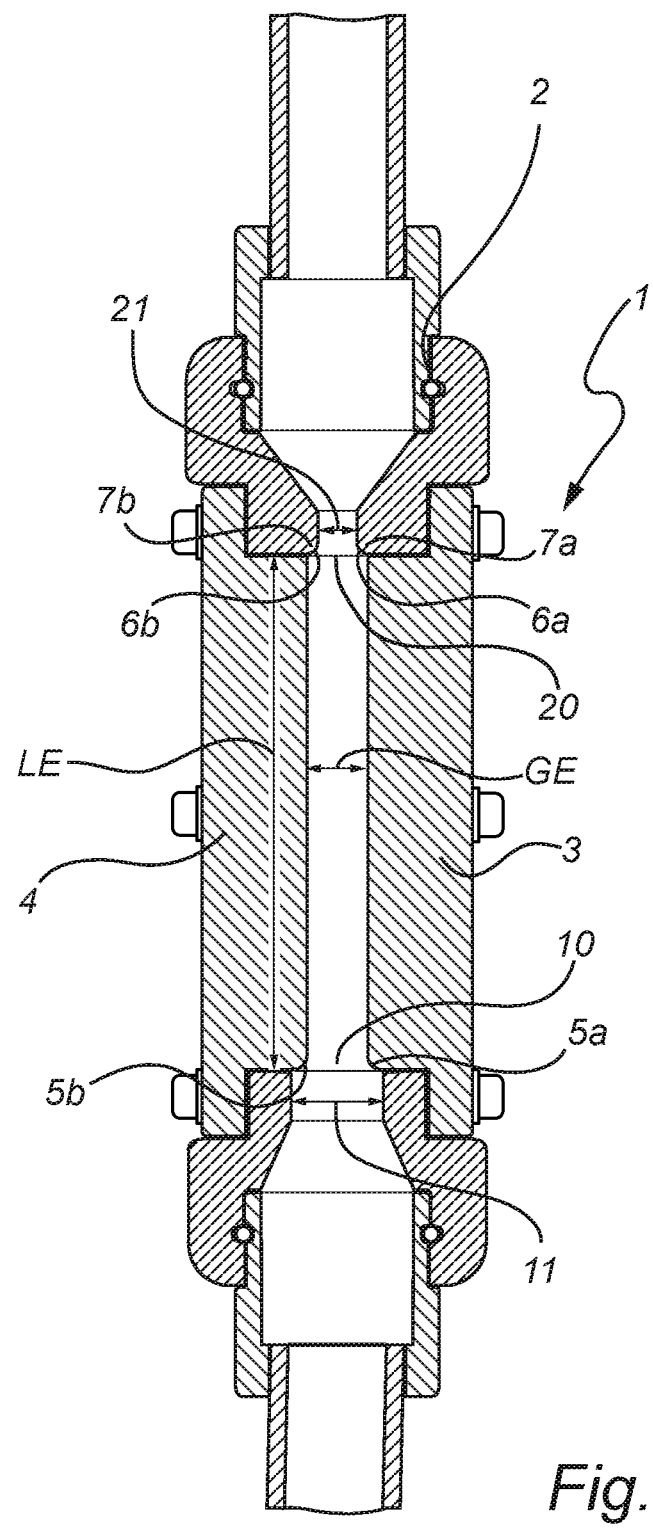

It should be noted that the PEF chamber shown in WO 2017/184066 may also be arranged to provide a geometrical narrowing. Moreover, and as shown in FIG. 4, the PEF chamber may be provided with two round electrodes arranged to form semi-circular pulse surfaces within the tube at the geometrical narrowing. In comparison, however, the present invention is directed to longitudinal electrodes which ends as such provide the first geometrical narrowing. This is an important difference when being compared to the arrangement shown in FIG. 4 of WO 2017/184066 where round electrodes are arranged inside of the geometrical narrowing. It should be noted that with longitudinal electrode units such as according to the present invention, the volume where there are losses are reduced. The end positions of the electrode units are the positions where there is an evident risk for losses in relation to the electric field provided. A long PEF treatment chamber, i.e. with longitudinal electrode units, provides a lower level of volume where losses may exist. Moreover, the limitation of length is decided by the maximum current in the PEF generator and the minimal cross section that the pumped material can have.

To summarize the above, one problem that needs to be solved when designing a PEF chamber is to get a uniform liquid flow through the chamber. If the edges are rounded it solves the electric field problem so that hot spots are prevented, but then it creates zones with still standing or slow flowing material. Simulations show that the problem with still standing zones is more problematic when the cross section of the channel is widened compared to when the cross section is narrowed. This is the reason why the countermeasure for high electric field is handled in different ways at the beginning and the end of the PEF chamber, as explained above. The temperature will rise at the corners where the material is rounded due to lower flow, but since the cross section is narrowed the problem is smaller and this makes a big difference for the intended applications, such as PEF treatment of pumpable foodstuffs. The shape of the chamber is an optimal compromise of avoiding high electric fields and high temperature increases. If the chamber is optimized for avoiding only high electric fields, then problems with still standing zones, high temperatures and overtreatment arise. This will create burning or sparks in the liquid when it becomes steam. If the chamber is optimized for a uniform flow only, then problems with high electric field arise which cause sparks.

To continue, according to yet another specific embodiment of the present invention, the exit flow portions of the PEF treatment tube are arranged to provide a second geometrical narrowing subsequent to the flow exit ends. This second geometrical narrowing may then be seen as an upper geometrical narrowing in the cases of embodiments as shown in the figures where the flow is pumped from bottom up. Moreover, the second geometrical narrowing is provided by the isolating material arranged subsequent to the electrode units.

It should be noted that suitably the second geometrical narrowing has a lower cross section area than the first geometrical narrowing. For example, with parallel electrode units this is a given fact, such as seen in the figures, however the electrode units do not have to be arranged this way according to the present invention. Preferably, however, the second geometrical narrowing has a lower cross section area than the first geometrical narrowing. In this regard it may also be mentioned, as should be clear from above, that the mechanical solutions of the first and second narrowings maty be of different type.

Also the actual measures of different parts of the PEF chamber according to the present invention may be of importance for the provision of an increased PEF treatment efficiency. According to one embodiment of the present invention, a relationship of a gap distance (GE) between the opposite electrode units in the PEF chamber to a length (LE) of each electrode unit has a LE/GE ratio of at least 3, preferably at least 6, more preferably at least 8, most preferably at least 10. This high ratio according to the present invention ensures that the relative loss volume, as explained above, is kept a low level. It should be noted that also LE/GE ratio values of at least 10, even above 15, may be important for certain applications, such as e.g. when treating whey protein or dairy products. Such values are possible to obtain according to the present invention.

According to yet another embodiment, a length (LE) of each electrode unit is at least 30 mm, preferably in a range of 30-600 mm, e.g. in a range of 50-600 mm, more preferably in a range of 30-300 mm, more preferably in a range of 30-200 mm, and wherein a gap distance (GE) between the opposite electrode units in the PEF chamber is at least 3 mm, preferably in a range of 3-45 mm. This type of sizes and relationship between length of the electrodes and the gap distance between the electrodes is suitable for the intended applications, such as treatment of continuous feedstuff flows, and suitable sizes of PEF generators.

Moreover, also the width of the electrode units may be of relevance. According to one specific embodiment of the present invention, a width (WE) of each electrode unit is at least 3 mm, preferably in the range of 3-45 mm. The width is especially of interest in relation to the gap distance between the electrodes and length of electrodes. In line with this, according to one embodiment of the present invention, a relationship of a gap distance (GE) between the opposite electrode units in the PEF chamber, a length (LE) of each electrode unit and a width (WE) of each electrode unit in the form of GE:WE:LE is in a ratio of from 3:3:20 mm to 45:40:200 mm. The suitable exact relationships depend on the intended industrial application, such as for treating foodstuffs, and which type of them, e.g. juice or crushed fruit, or if it is other types of materials, such as sewage sludge or the like.

Furthermore, the relationship of the possible geometrical narrowings to the gap distance between the electrodes may also be of relevance. In line with this, according to one specific embodiment of the present invention, the first geometrical narrowing is arranged as a gap distance (GE) between the opposite electrode units, which (GE) is in the range of 40-80%, preferably in the range of 45-64%, of a first tube distance arranged before the opposite electrode units in the intended flow direction. The first tube distance is thus the distance between the sides of the isolating material tube before the electrodes. Again, suitable the gap distance (GE) is suitably constant as the electrode units suitable are parallel, but this is not a must.

Moreover, according to yet another specific embodiment of the present invention, the second geometrical narrowing is arranged with a second tube distance which is in the range of 65-95%, preferably in the range of 70-80%, of a gap distance (GE) between the opposite electrode units. The second tube distance is the thus the distance between the sides of the isolating material tube subsequent to the electrodes.

Moreover, the actual rounded shape of the electrode units as well as the isolating material subsequent to the electrode units may also be of importance. According to one specific embodiment of the present invention, the flow receiving ends are rounded with a radius to form an angle between a material arranged before the opposite electrode units and the actual opposite electrode units in a range of 70-110 degrees. As an example, angles around 90 degrees are very suitable. In line with this, the same type of angles is of interest for the isolating material subsequent to the electrode units. Therefore, according to one specific embodiment, the exit flow portions are rounded with a radius to form an angle between the flow exit ends of the electrode units and the actual exit flow portions in a range of 70-110 degrees. Also here angles around 90 degrees are very suitable.

Furthermore, according to one specific embodiment of the present invention, the PEF treatment tube comprises a turbulence unit, preferably a helix unit, arranged before the flow receiving ends of the electrode units. The turbulence unit is arranged before the electrodes in a flow direction. The turbulence unit is arranged to provide turbulence in the flow before the enter of the flow between the electrode units. A turbulent flow is more randomized which is preferable when treating a flow with electric pulses. Still standing spots in the flow are inhibited, which are occurring in laminar flows. This is preferable. As mentioned above, a helix is one possible type of unit which is possible as the turbulence unit. In relation to a helix it may also be mentioned that a helix may imply an increased flow velocity close to edges inside of the treatment volume and tube. This may be accomplished by the provision of rotation of the flow, which may be obtained by a helix. The helix may as such provide a flow velocity which is more or less the same inside of the volume, and not much higher in the middle of the treatment volume.

The PEF chamber and tube according to the present invention may also instead or in addition comprise other types of units arranged to enable a turbulence flow between the electrodes. Therefore, according to one specific embodiment of the present invention, there is one or more wings arranged on one or both chamber walls beside the opposite electrode units. On the sides of the electrodes and inside of the PEF chamber there are tube walls which do not constitute the electrodes. Here wings or other protruding units may be provided to inhibit a laminar flow profile. Such wings may be arranged as a standalone solution or in addition to a turbulence unit provided before the electrode units.

According to yet another specific embodiment of the present invention, a splitter is arranged at the end of a treatment volume of the PEF treatment tube. A splitter according to the present invention may decrease the e-field at the end of the electrodes. The high e-field spots are as such moved into the middle of the treatment volume where the flow velocity is the highest. Such a high e-field spot will then be provided at the beginning of the splitter. The splitter may be rounded in shape in this beginning of the splitter. The beginning of the splitter will also then have almost the highest flow velocity in the treatment volume. Therefore, the present invention may also ensure that an increased e-field is obtained where the flow velocity is high.

Moreover, as hinted above, the present invention is intended for treatment of continuous flows, e.g. foodstuffs or waste water or the like. Examples are orange juice, carrot juice, apple juice, waste water or sludge, crushed olives, crushed grapes for wine production, whey protein, dairy products, egg treatment, etc. Therefore, the present invention also relates to a method for treating a continuous flow, said method involving using a PEF chamber according to the present invention.

As should be clear from above, the present invention provides many advantages in comparison to known PEF chambers. To summarize some of these advantages it may be mentioned that the present invention provides an effective flow profile where there is a low risk of a part of the flow standing still and deminishes the problem with hots spots where the electric field is very high at the electrode units. Moreover, the present invention also ensures that there is reduction of the chamber volume where there are losses.

DETAILED DESCRIPTION OF THE DRAWINGS

In FIG. 1 there is shown a PEF chamber 1 according to one embodiment of the present invention. The PEF chamber 1 comprises a PEF treatment tube 2 and opposite electrode units 3, 4 which are insertable into the PEF chamber 1. In this case it may be noted that the electrode units 3, 4 are attachable and detachable by arranged screws.

Furthermore, the opposite electrode units 3, 4 each has one flow receiving end 5a, 5b and one flow exit end 6a, 6b. As notable, in this case it is intended that the flow to be treated is pumped into the bottom and up through the PEF chamber 1 and PEF treatment tube 2. Moreover, as may be seen the flow receiving ends 5a, 5b are rounded or bent in an intended flow direction into the PEF treatment tube 2. Furthermore, also the width of the electrode units (WE) is depicted in this embodiment.

Figure 2:
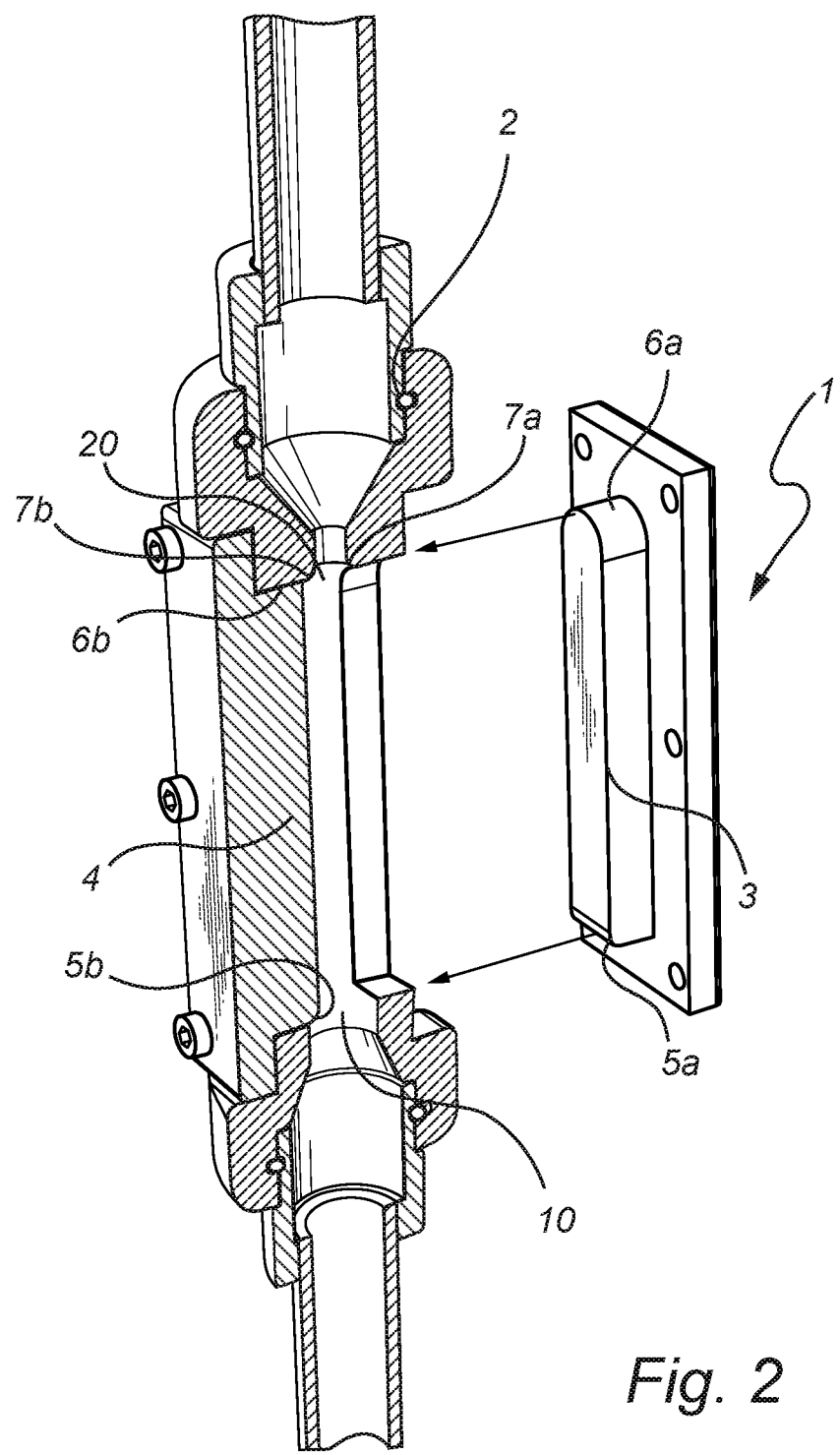

In FIG. 2 there is shown a similar embodiment as shown in FIG. 1. In this case it is also shown that the PEF treatment tube 2 comprises exit flow portions 7a, 7b arranged subsequent to the flow exit ends 6a, 6b of the electrode units 3, 4 in the intended flow direction. These exit flow portions 7a, 7b are part of the isolating material arranged subsequent to the electrode units 3, 4, thus functioning as extensions of the opposite electrode units 3, 4 in the intended flow direction. Moreover, also these exit flow portions 7a, 7b are rounded or bent in an intended flow direction.

Furthermore, as seen in this embodiment, the electrode units 3, 4 are arranged in the PEF treatment tube 2 to provide a first geometrical narrowing 10 at the flow receiving ends 5a, 5b. Moreover, the exit flow portions 7a, 7b of the PEF treatment tube 2 are also arranged to provide a second geometrical narrowing 20 subsequent to the flow exit ends 6a, 6b. This implies that two geometrical narrowings are provided along the flow path from, in this case, lower inflow side to the upper outflow side.

Figure 3:
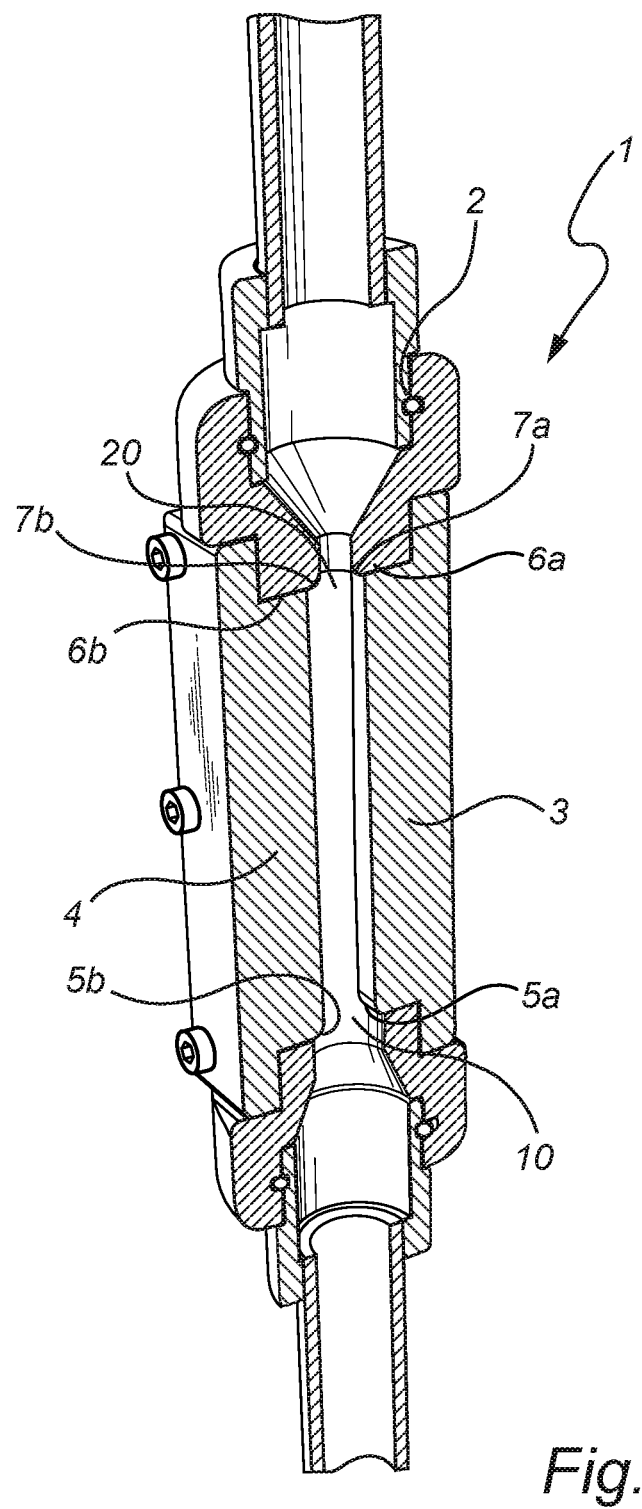

In FIG. 3 there is shown the embodiment as shown in FIG. 2, however here both electrode units 3, 4 are put in in place into the PEF chamber.

In FIG. 4 there is also shown an embodiment in line with the ones shown in FIGS. 1-3. In this case, a gap distance GE between the opposite electrode units 3, 4 in the PEF chamber and the length LE of the electrodes are also depicted. Moreover, also a first tube distance 11 arranged before the opposite electrode units 3, 4 in the intended flow direction is also depicted. Furthermore, and in line with this, a second tube distance 21, which is the tube diameter subsequent to the electrodes, is also shown in FIG. 4.

The invention claimed is:

1. A PEF (pulsed electric field) chamber intended for treating a flow with electric field pulses, said PEF chamber comprising:
   a PEF treatment tube; and
   opposite electrode units,
   wherein each one of said opposite electrode units has one flow receiving end and one flow exit end,
   wherein the PEF treatment tube comprises exit flow portions arranged subsequent to the flow exit ends of the electrode units in an intended flow direction, and thus functioning as an extension of the opposite electrode units in the intended flow direction,
   wherein the opposite electrode units are longitudinal,
   wherein the flow receiving ends are rounded in the intended flow direction into the PEF treatment tube,
   wherein the exit flow portions are rounded in the intended flow direction,
   wherein the opposite electrode units are arranged in the PEF treatment tube to provide a first geometrical narrowing at the flow receiving ends, and
   wherein the exit flow portions of the PEF treatment tube are arranged to provide a second geometrical narrowing subsequent to the flow exit ends.

2. The PEF chamber according to claim 1, wherein each electrode unit is insertable into matching grooves of the PEF treatment tube of the PEF chamber.

3. The PEF chamber according to claim 1, wherein a relationship of a gap distance (GE) between the opposite electrode units in the PEF chamber to a length (LE) of each electrode unit has a LE/GE ratio of at least 3, preferably at least 6, more preferably at least 8, most preferably at least 10.

4. The PEF chamber according to claim 1, wherein a length (LE) of each electrode unit is at least 30 mm, preferably in a range of 30-600 mm, more preferably in a range of 30-300 mm, more preferably in a range of 30-200 mm, and wherein a gap distance (GE) between the opposite electrode units—in the PEF chamber is at least 3 mm, preferably in a range of 3-45 mm.

5. The PEF chamber according to claim 1, wherein a width (WE) of each electrode unit is at least 3 mm, preferably in the range of 3-45 mm.

6. The PEF chamber according to claim 1, wherein a relationship of a gap distance (GE) between the opposite electrode units in the PEF chamber, a length (LE) of each electrode unit and a width (WE) of each electrode unit in the form of GE:WE:LE is in a ratio of from 3:3:20 mm to 45:40:200 mm.

7. The PEF chamber according to claim 1, wherein the first geometrical narrowing is arranged as a gap distance (GE) between the opposite electrode units, which (GE) is in the range of 40-80%, preferably in the range of 45-64%, of a first tube distance arranged before the opposite electrode units in the intended flow direction.

8. The PEF chamber according to claim 1, wherein the second geometrical narrowing is arranged with a second tube distance which is in the range of 65-95%, preferably in the range of 70-80%, of a gap distance (GE) between the opposite electrode units.

9. The PEF chamber according to claim 1, wherein the flow receiving ends are rounded with a radius to form an angle between a material arranged before the opposite electrode units and the actual opposite electrode units in a range of 70-110 degrees.

10. The PEF chamber according to claim 1, wherein the exit flow portions are rounded with a radius to form an angle between the flow exit ends of the electrode units and the actual exit flow portions in a range of 70-110 degrees.

* * * * *